March 27, 1951        A. FRY ET AL        2,546,736
WINDING ARRANGEMENT IN ELECTRICAL APPARATUS
Filed Aug. 12, 1949        3 Sheets—Sheet 1
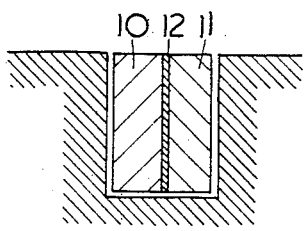
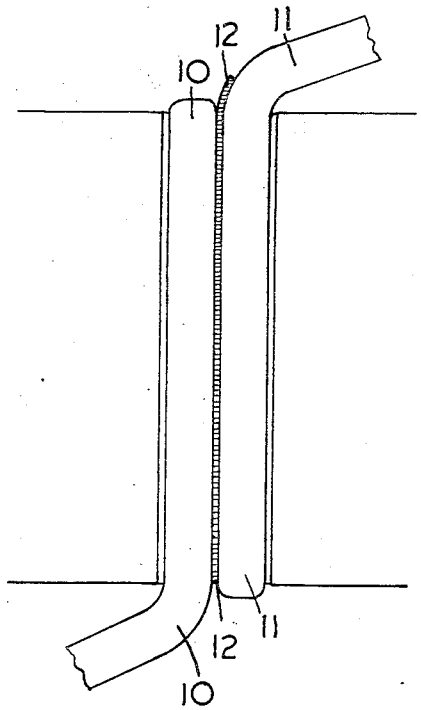
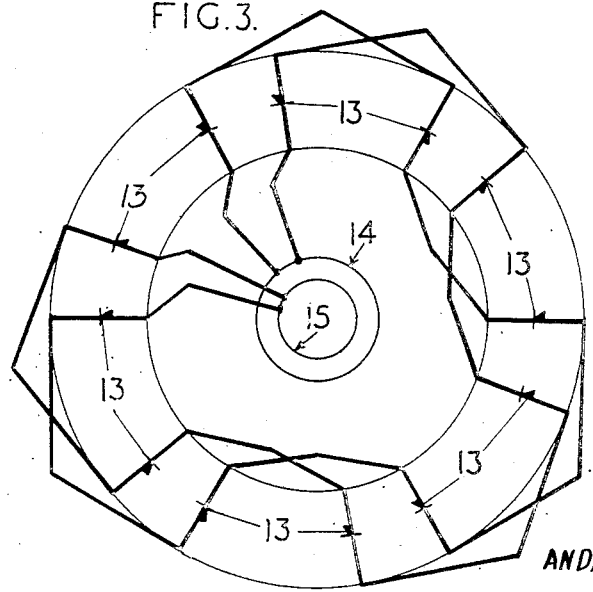
Inventors
ANDREW FRY AND
FREDERICK ARTHUR FRY
By Linton & Linton Attorneys

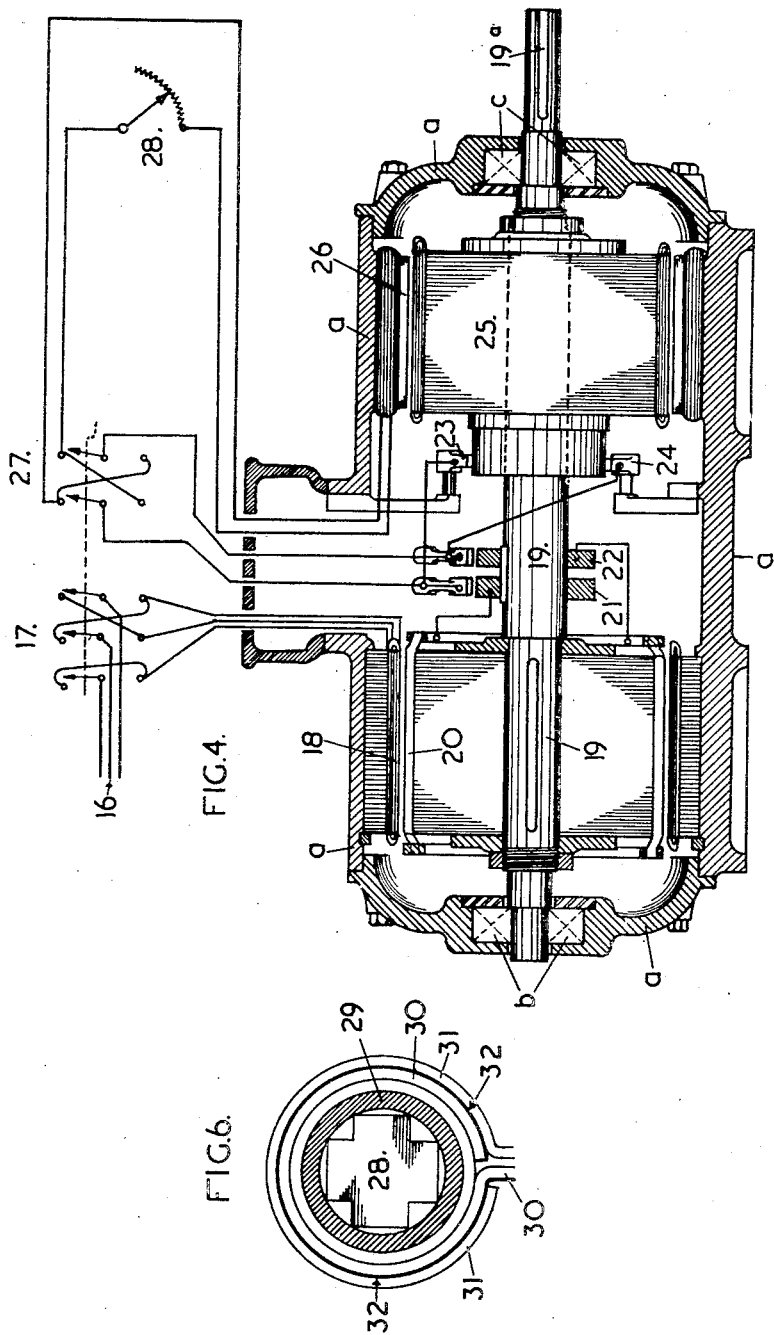

March 27, 1951
A. FRY ET AL
2,546,736
WINDING ARRANGEMENT IN ELECTRICAL APPARATUS
Filed Aug. 12, 1949
3 Sheets—Sheet 3
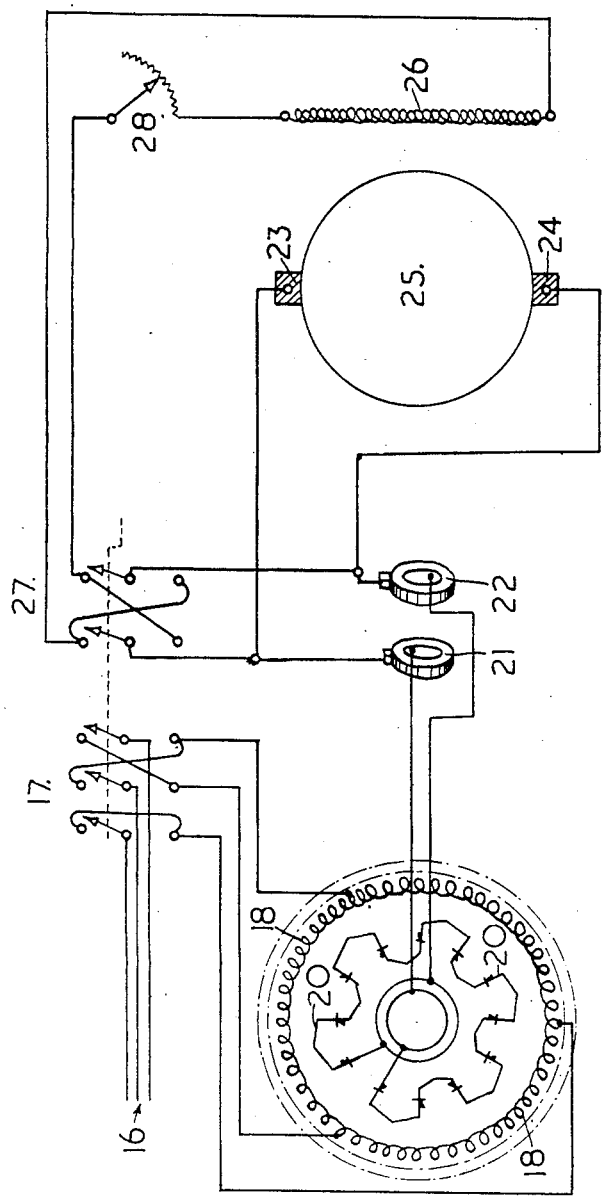
Inventors
ANDREW FRY AND
FREDERICK ARTHUR FRY
Linton and Linton
Attorneys Patented Mar. 27, 1951

2,546,736

UNITED STATES PATENT OFFICE 2,546,736

WINDING ARRANGEMENT IN ELECTRICAL APPARATUS

Andrew Fry and Frederick Arthur Fry, Liverpool, England, assignors to Rotor Power Units Limited, Liverpool, England, a company of Great Britain and Northern Ireland Application August 12, 1949, Serial No. 109,918
In Great Britain August 13, 1948

4 Claims. (Cl. 171—252)

This invention relates to improvements in electrical apparatus and, in particular, apparatus of the type using electro-magnetic induction, as, for example, electric generators, electric motors, and transformers; the invention having for its primary object to provide means in such apparatus whereby many operations may be carried out more efficiently, or with greater flexibility of control, or with a better use of component materials, or in a more conveniently compact manner, than heretofore.

Electrical apparatus of the type referred to and according to our invention is broadly characterised in that a winding or windings thereof is or are in sections separated one from another by rectifying means.

A well-known property of a rectifying agent is that the resistance it offers to a flow of electric current is dependent upon the direction of flow, and by virtue of this property a current of non-zero mean value may be caused to flow by a varying electro-motive force, even though the electro-motive force has zero mean value. Hence a winding or windings used, according to the present invention, may supply or receive that which is commonly known as direct (D. C.) current. Examples of well known and suitable rectifying agents are copper oxide and selenium.

Preferably said winding or windings will comprise two parallel conductors separated one from the other by the rectifying agent only, the end of one section forming one terminal or pole of the apparatus or supply and the end of the other section forming the other terminal or pole of the apparatus or supply.

According to a further feature of the present invention, a coil or winding for an electrical apparatus comprises at least two separate conductors wound side-by-side and in electrical contact one with the other through a rectifying agent interposed between the neighbouring sides of said conductors. The end of one conductor thus forms one end of the coil or winding and the end of the other conductor forms the other end of the coil or winding.

Our invention may be applied with advantage to motors and generators generally wherein the rectifying windings may be the windings of the stator and/or of the rotor, the particular arrangement adopted depending on the design and purpose of the apparatus. In particular, windings, according to our invention, may be applied to any A. C. apparatus to provide D. C. exciter current for field windings.

A further application of our invention is to improve the power factor correction of alternating current machinery. As is known, the power factor of such machinery can be improved by the introduction of a D. C. component; and the present invention enables the provision of a very simple and compact generator for obtaining this D. C. component. Such a direct-current generator can be readily built into an alternator, and the absence of a commutator makes it particularly simple and compact, or one or more windings having sections separated by rectifying means can be incorporated in the part supplying A. C. so as to provide a D. C. component to combine with such A. C.

In applying the invention to a transformer, the secondary winding, at least, will comprise two side-by-side or parallel conductors making contact one with the other via a copper-oxide, selenium, or like film. A D. C. output will thus be obtained from the transformer without necessity for the usual external rectifier apparatus. By duplicating one of the windings it is possible to obtain the equivalent of full wave rectification in the output from the transformer.

We will further describe our invention with the aid of the accompanying diagrams and drawings which illustrate by way of examples only and not of limitation, several applications of same.

In said drawings—

Fig. 1 is a simple diagrammatic cross-section, and Fig. 2 a plan view, of a portion of a winding such as could be used in an electrical apparatus where the windings pass through slots.

Fig. 3 is a diagram of part of the windings of an armature for a rotating type of machine.

Fig. 4 is a diagrammatic longitudinal section of a variable speed reversing motor embodying the invention, and Fig. 5 is an electrical circuit diagram of the machine of Fig. 4.

Fig. 6 is a diagram illustrating the application of our invention to a transformer.

Referring first to Figs. 1 to 3 inclusive, and in the application of the invention to a direct current generator, the generator armature may be of usual construction having laminations slotted to receive the windings. The armature may be the moving member as in conventional direct current generators, or may be the stationary member.

The portions of the windings in the slots consist of two parallel conducting sections their adjacent faces being separated by the rectifying agent which may be attached to one or both of the sections, or may be unattached to either. In Fig. 1 two conducting sections 10 and 11 are in electrical contact through a rectifying agent 12, as, for example, selenium or copper oxide.

It is to be noted that although the sections 10 and 11 have been described as parallel conducting sections, this is in no way limitative of the invention, and they may be of any convenient shape as is desirable from mechanical, electrical, thermal, or constructional considerations: nor is it essential that the rectifying portions be confined to the slots. There may be a plurality of such elements in a slot or other convenient position, and there may be parts of the winding which contain no rectifying element.

It will be seen in Fig. 2 of the drawings that one end of each conducting section is prolonged for connection as desired.

In the armature winding of Fig. 3, the rectifying elements 13 are illustrated in conventional symbolic form: the winding shown is such as could be used in a six pole machine, and, whilst two circuits only are indicated, there may be a plurality of these as desired. One pair of similar ends of each circuit are shown as connected to a slip-ring 14, the other pair of similar ends being connected to another slip-ring 15. Whilst every portion of the winding which passes through a slot is shown on the diagram as having a rectifying element, this is by no means essential, according to the invention, as some may be omitted and replaced by an ordinary conductor, the number of rectifying elements needed in a particular circuit being determined by the voltage to be generated.

In use, alternating electro-motive forces will be set up in the windings by mechanical rotation of the armature relative to the six-pole field, or/and by electrical rotation of the field itself, but, by the action of the rectifying elements, the current which may be passed to the slip-rings will be substantially unidirectional. Said slip-rings 14 and 15 may be used to pass current to or from other electrical apparatus as desired. It will be seen that a machine as just described possesses an advantage in that it will provide a D. C. output without necessity for the usual commutator, with its known disadvantages, or other separate and expensive rectifying apparatus.

It will also be appreciated that such a machine may be advantageously used to supply a load to, say, a battery, or other apparatus capable of returning power to the generator, as, if the generator be stopped, then by virtue of the rectifying action of the windings, a negligible current will be allowed to flow, thus obviating necessity for expensive switches and relays normally used to prevent reverse current flow.

In the machine of Fig. 4, a three-phase alternating current supply 16 is connected through a reversing switch 17 to the stator winding 18 of an A. C. motor, the corresponding rotor whereof is mounted on a shaft and contains windings 20 with rectifying elements of the form described with reference to Figure 3. D. C. current from said rotor windings 20 passes through slip rings 21 and 22. Also mounted on shaft 19 is a D. C. motor, that illustrated being a shunt motor. Connection is made from the slip rings 21, 22 to the commutator brushes 23 and 24, which pass current into the D. C. motor armature 25. Connection is also made from said slip rings to the shunt field 26 of the D. C. motor by means of a further reversing switch 27 and a variable resistor 28. The mechanical drive from the motor is taken from the protruding shaft end 19ª.

Switches 17 and 27 are mechanically coupled together and may be so arranged as to have three normal positions, i. e. off, forward rotation, and reverse rotation. a indicates the casing of the machine and b and c bearings wherein shaft 19 is journalled.

Turning now more particularly to Figure 5, which is an electrical circuit of the machine shown in Figure 4, the three-phase alternating current supply 16 passes through switch 17 to energise the stator winding 18. This will produce a rotating magnetic field, movement of which relative to the rotor will produce a D. C. output from the slip rings 21 and 22 in manner as described with reference to Figure 3. This D. C. output is fed to the D. C. shunt motor portion of the machine, and, in use, the three-phase portion of the machine will act as an induction motor and give a driving torque to shaft 19. The connections to the D. C. motor are such that the torque produced by it will add to the torque of the induction motor portion. As the speed of the machine increases, the speed of the rotor windings 20 relative to the rotating magnetic field will decrease. The opposing voltage (back E. M. F.) generated in the D. C. armature 25 will increase with increasing speed, and also with increasing magnetic field produced by the shunt field winding 26. At a certain speed the back E. M. F. would be greater than the voltage supplied from slip rings 21, 22, but if this were so, then, because of the action of the rectifying windings 20, negligible current would flow in the rotor of the induction motor, and its torque would fall. Since in this case no electrical power would then be passing to the D. C. motor, said motor would not develop a useful positive torque. The machine's speed will therefore settle at some lower value to give a stable operating speed depending upon the excitation of the shunt field, and this speed can be changed by variation of the current in the shunt field. The machine's speed can thus be controlled by the variable resistor 28.

Said two switches 17 and 27 are coupled by suitable means in order that when it is desired to reverse the machine, both switches reverse together. By these means rotation of the field produced by the stator windings 18 is reversed, and also the magnetic field produced by the windings 26. As the polarity of the D. C. voltage supplied by slip rings 21 and 22 will remain unchanged due to the action of the rectifying windings 20, the torque of the D. C. motor will be reversed and the machine will be capable of being controlled with reverse speeds, as it was for forward speeds.

It should be noted that although one circuit only has been shown for the winding 20 (Fig. 5), a plurality of such circuits may be used, as explained with reference to Figure 3, and preferably arranged to give a full-wave rectification.

The arrangement shown in Figures 4 and 5 are in no way limitative of the application of the invention to a motor. The mechanical connection between the two parts of the machine may be by any convenient means—i. e. other than a common shaft. Also the A. C. supply is not limited to three phases and may be of any number of phases. The D. C. motor portion is not limited to a shunt connection and may be a series motor, a shunt motor, or combination of both or any other suitable form of D. C. motor, as is desired to give different characteristics to the torque speed curve of the complete machine.

When it is desired to reverse the torque of the D. C. portion this may be done by any convenient method; for example, in the circuit illustrated in Figure 5, the connections to the armature 25 could have been reversed instead of the field connections to obtain the desired result. The design of the machine may include any of the usual features found in electrical machines if so desired, examples of such being methods of pole-changing on the A. C. stator, and variable or fixed resistance in the D. C. machine circuit to minimise unwanted current or voltage surges.

The diagram of Fig. 6 is representative of a cross-section of a limb 28' in which usual transformer laminations forming the core of said limb have around them a primary winding 29. The secondary winding consists of two conducting sections 30 and 31 in contact through a rectifying element 32 of selenium or copper oxide. There may be a plurality of such secondary coils distributed on limb 28' substantially as in normal transformer construction, the number and connections of such coils being dependent on the voltage to be generated in the windings. It will be seen that by virtue of said rectifying elements 32, the output from the secondary winding will be substantially unidirectional.

What we claim as our invention and desire to secure by Letters Patent is:

1. A winding arrangement for electrical apparatus operable on the principle of electro-magnetic induction, characterized in that portions of the windings consist of terminal lengths electrically connected through rectifying means separating the adjacent faces of said terminal lengths from one another.

2. A winding arrangement for electrical apparatus according to claim 1 characterized in that the terminal lengths and rectifying means are disposed in slots provided in the core of an induction apparatus located in an alternating field set up by a primary winding associated with the core.

3. The combination with the core of an induction apparatus located in an alternating field set up by a primary winding associated with said core, said core having slots formed therein, a winding on said core including conductors having pairs of terminal lengths seated within at least one of the slots of said core, rectifying material located in the slots of said core and said rectifying material being arranged in electrical contact with said conductors throughout the terminal lengths thereof.

4. A winding arrangement for electrical apparatus according to claim 1, characterised in that said terminal lengths of the windings are arranged in relation to an inducing field so as to have full wave rectification.

ANDREW FRY.
FREDERICK ARTHUR FRY.

REFERENCES CITED

The following references are of record in the file of this patent:

UNITED STATES PATENTS

| Number | Name | Date |
|---|---|---|
| 1,116,283 | Howard | Nov. 3, 1914 |
| 1,792,512 | Siegmund | Feb. 17, 1931 |
| 2,066,508 | Young | Jan. 5, 1937 |
| 2,138,160 | Hansell | Nov. 29, 1938 |
| 2,204,916 | Shotter | June 18, 1940 |
| 2,319,625 | Ostrander | May 18, 1943 |